United States Patent
Hampel et al.

(10) Patent No.: US 9,072,041 B2
(45) Date of Patent: Jun. 30, 2015

(54) ARCHITECTURE FOR CELLULAR NETWORKS

(71) Applicants: Georg Hampel, New York City, NY (US); Moritz Steiner, Montclair, NJ (US)

(72) Inventors: Georg Hampel, New York City, NY (US); Moritz Steiner, Montclair, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 65 days.

(21) Appl. No.: 13/713,429

(22) Filed: Dec. 13, 2012

(65) Prior Publication Data

US 2014/0169268 A1 Jun. 19, 2014

(51) Int. Cl.
| H04W 4/00 | (2009.01) |
| --- | --- |
| H04L 12/28 | (2006.01) |
| H04W 40/34 | (2009.01) |
| H04W 76/00 | (2009.01) |
| H04W 76/02 | (2009.01) |
| H04W 76/06 | (2009.01) |

(52) U.S. Cl.
CPC .............. *H04W 40/34* (2013.01); *H04W 76/00* (2013.01); *H04W 76/02* (2013.01); *H04W 76/022* (2013.01); *H04W 76/06* (2013.01); *H04W 76/062* (2013.01)

(58) Field of Classification Search
USPC .................................. 370/328, 338, 401, 410
See application file for complete search history.

(56) References Cited

U.S. PATENT DOCUMENTS

| 8,532,046 | B2 * | 9/2013 | Hu et al. ........................ 370/329 |
| 8,553,643 | B2 * | 10/2013 | Flore et al. .................... 370/331 |
| 2006/0148475 | A1 * | 7/2006 | Spear et al. .................... 455/436 |
| 2007/0250642 | A1 * | 10/2007 | Thubert et al. ................ 709/245 |
| 2009/0047947 | A1 * | 2/2009 | Giaretta et al. ............. 455/432.1 |
| 2010/0061340 | A1 * | 3/2010 | Ramle et al. .................... 370/331 |
| 2010/0290621 | A1 * | 11/2010 | Muhanna et al. ............. 380/270 |
| 2011/0261787 | A1 * | 10/2011 | Bachmann et al. ........... 370/331 |
| 2012/0201222 | A1 * | 8/2012 | Muhanna et al. ............. 370/331 |
| 2013/0083773 | A1 * | 4/2013 | Watfa et al. .................... 370/331 |
| 2013/0128864 | A1 * | 5/2013 | Kim .............................. 370/331 |

FOREIGN PATENT DOCUMENTS

DE 20 2007 005533 U1 9/2007

OTHER PUBLICATIONS

C. Perkins IP Mobility Support for IPv4. RFC 3344, IETF network Working Group, Aug. 2002, Oct. http://www.jeft.org/rfc3344.txt.
Ramjee et al., "Hawaii: A Domain-Based Approach for Supporting Mobility in Wide-Area Wireless Netw3orks", IEEE/ACM Transactions on Networking, vol. 10, No. 3, Jun. 2002, pp. 396-410.

(Continued)

*Primary Examiner* — Andrew Lee
(74) *Attorney, Agent, or Firm* — Kramer & Amado, P.C.

(57) ABSTRACT

Various exemplary embodiments relate to a method for transmitting data packets in a cellular network to a user equipment using a first distributed access gateway, including: receiving a first tunnel request from a second distributed access gateway; establishing a first tunnel with the second distributed access gateway; receiving a first data packet destined to the user equipment from a native packet transport network; and transmitting the first data packet to the user equipment via the first tunnel to the second distributed access gateway.

20 Claims, 7 Drawing Sheets

(56) References Cited

OTHER PUBLICATIONS

Digital Cellular Telecommunications System (Phase 2 +); Universal Mobile Telecommunications Systems (UMTS), General Packet Radio Service (GPRS); GPRS Tunnelling Protocol (GTP) across the Gn and Gp interface (3GPP TS 20.060 version 11.4.0 Release 11), Oct. 1, 2012.

Notification of Transmittal of the International Search Report and the Written Opinion of the International Searching Authority, or the Declaration, mailed in PCT/US2013/073513, Apr. 30, 2014.

Kempf, et al., "Moving the Mobile Evolved Packet Core to the Cloud", 2012 IEEE 8th Int'l. Conf. on Wireless and MObile Computing, Networking and Communications (WIMOB 2012), Oct. 8, 2012, 784-791.

* cited by examiner

ARCHITECTURE FOR CELLULAR NETWORKS

TECHNICAL FIELD

Various exemplary embodiments disclosed herein relate generally to cellular network architectures.

BACKGROUND

Some known LTE cellular networks rely on tunneling mechanisms. In these networks, for each user, several tunnels are set up for its data to travel through the network core and reach the Internet. These tunnels may enable mobility, billing, and legal intercept. In order to provide the signaling involved with the tunnel setup and termination as well as the state associated with the tunnels, very powerful specialized hardware such as for example, serving gateway (SGW), PDN gateway (PGW), and mobile management entity (MME) may be required. This architecture does not facilitate caching of content close to the user. Further, this architecture does not facilitate "local breakout" of data, which means that all data may need to travel through several network elements into the network core, before it can be routed to the Internet.

Recent data collected from operating LTE networks shows that the median connection duration for a user equipment (UE) is 13 seconds. Moreover, 97% connections use 1 cell only (no session mobility), 2.7% connections use 2 cells, and only 0.3% connection use 3+ cells. This observed pattern may be partly due to push notifications sent to the UEs by a multitude of applications. This observed behavior suggests that most sessions are short lived, and that many sessions are created and terminated each time a mobile device accesses the network. Once voice calls are carried over LTE, the number of connections that use more than one cell might increase because voice calls tend to be longer duration connections. Conversely, with the increase of machine to machine (M2M) type communications, LTE networks and other cellular networks may be faced with several orders of magnitudes more endpoints than today. A large number of the M2M communications may include sending a tiny amount of data every few minutes, hours, or days without any mobility involved. As a result, today's tunneling based approaches may be overwhelmed with this signaling explosion because of the overhead involved in setting up and terminating the tunnels needed for such communication.

Existing cellular networks have been designed with the assumption that UEs are mostly idle and rarely active, but if they become active they are fast moving.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method for transmitting data packets in a cellular network to a user equipment using a first distributed access gateway, including: receiving a first tunnel request from a second distributed access gateway; establishing a first tunnel with the second distributed access gateway; receiving a first data packet destined to the user equipment from a native packet transport network; and transmitting the first data packet to the user equipment via the first tunnel to the second distributed access gateway.

Various exemplary embodiments relate to a method for transmitting data packets in a cellular network to a user equipment using a first distributed access gateway, including: receiving a first data packet from a user equipment; determining the network address of the user equipment associated with a second distributed access gateway; establishing a tunnel with the second distributed access gateway associated with the user equipment; transmitting the first data packet from the user equipment to the second distributed access gateway via the tunnel.

Various exemplary embodiments relate to a distributed access gateway, comprising: a data storage unit; a network interface; and a processor configured to: receive a first tunnel request from a second distributed access gateway; establish a first tunnel with the second distributed access gateway; receive a first data packet destined to a user equipment from a native packet transport network; and transmit the first data packet to the user equipment via the first tunnel to the second distributed access gateway.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

Figure 1:
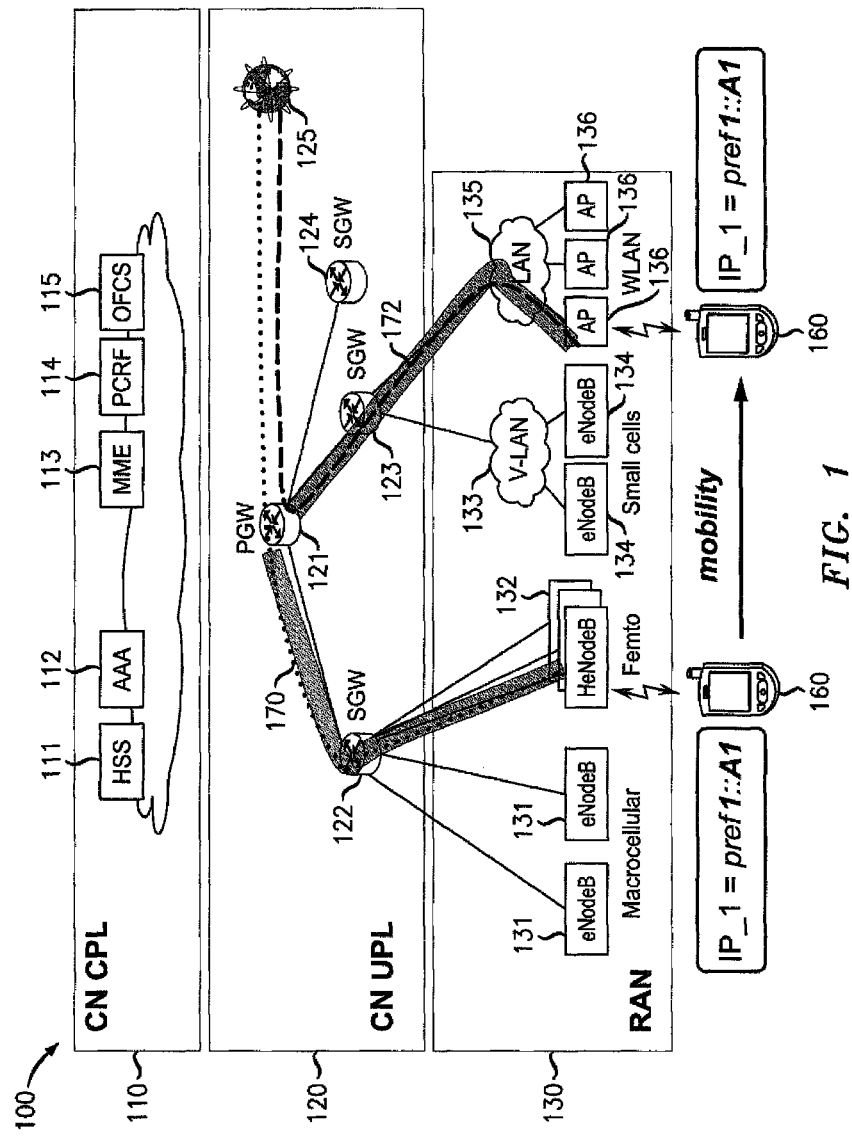
FIG. 1 illustrates a current cellular network that may include LTE functionality.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments may be combined with one or more other embodiments to form new embodiments.

Referring now to the drawings, in which like numerals refer to like components or steps, there are disclosed broad aspects of various exemplary embodiments.

Various embodiments provide a method and apparatus for providing a cellular network core architecture that exploits the observation that session mobility may be low by optimizing tunneling requirements. Advantageously, optimizing tunneling enables the use of standard IP gear (routers, switches) and more efficient content dissemination and traffic routing. In particular, by default mobility management is not performed (i.e., no tunnels are invoked), but tunnels may be invoked if a UE moves from one cell to another.

The description below may use terminology, concepts, network elements, etc. from current long term evolution (LTE) networks. Such description is only meant to be an example of the types of cellular networks that might benefit from the methods and architecture described in the embodiments below. Other cellular networks may also implement the embodiments described below.

FIG. 1 illustrates a current cellular network that may include LTE functionality. The cellular network 110 may include a core network (CN) control plane (CPL) 110, a CN user plane (UPL) 120, and a radio access network (RAN) 130.

The CN CPL 110 may provide various control functions for the cellular network 110 and may include a home subscriber server (HSS) 111, an authorization database (AAA) 112, a MME 113, a policy and charging rule function (PCRF) 114, and an offline charging system (OFCS) 115. Control functions may include known standard control functions of a cellular network such as cellular network 100.

In the CN UPL 120, user data may be transported between the packet data network 125, which may be the internet or some other network, and the RAN 130. The RAN 130 provides the radio connection and interface with a user equipment (UE) 160. The CN UPL 120 may include a PGW 121 and a number of SGWs 122, 123, 124.

SGW 122 may be a device that provides gateway access between the CN UPL 120 and the RAN 130. SGW 122 may be the first device within the CN UPL 120 that receives packets sent by UE 160. SGW 122 may forward such packets toward PGW 112. SGW 122 may perform a number of functions such as, for example, managing mobility of UE 160 between multiple base stations such as eNodeB 131, HeNodeB 132, etc. and enforcing particular quality of service (QoS) characteristics for each flow being served. In various exemplary embodiments, CN UPL may include multiple SGWs 122, 123, 134 and each SGW may communicate with multiple base stations.

PGW 121 may be a device that provides gateway access to packet data network 125. PGW 121 may be the final device within the CN UPL 120 that receives packets sent by UE 160 toward packet data network 125 via SGWs 122, 123, 124. PGW 121 may include a policy and charging enforcement function (PCEF) that enforces policy and charging control (PCC) rules for each service data flow (SDF). Therefore, PGW 121 may be a policy and charging enforcement node (PCEN). PGW 121 may include a number of additional features such as, for example, packet filtering, deep packet inspection, and subscriber charging support. PGW 121 may also be responsible for requesting resource allocation for unknown application services.

The RAN 130 may include eNodeB 131, 134, HeNodeB 132, virtual local area network (V-LAN) 133, local area network (LAN) 134, and access points (AP) 136. eNodeBs 131, 134 are the base stations used in LTE networks for communication with UE 160. eNobeBs 132 may be used for macro-cellular situations covering for example a large area or a large number of uses and may be connected to SGW 132. eNodeBs 134 may service small cells and be connected to a V-LAN 133 which may be connected to SGW 123. HeNodeB 132 may provide femtocells for communication with the UE 160 and may be connected to SGW 122. Further, APs 136 may provide access for the UE 160 to the LAN 135. The APs 136 may be WiFi access points, in which case the APs 136 and LAN 135 implement a WiFi local area network (WLAN).

UE 160 may be a device that communicates with packet data network 125 for providing the end-user with a data service. Such data service may include, for example, voice communication, text messaging, multimedia streaming, and Internet access. More specifically, in various exemplary embodiments, user equipment 160 is a personal or laptop computer, wireless email device, cell phone, tablet, television set-top box, or any other device capable of communicating with other devices via CN UPL 120.

Communication between the PGW 121 and the UE 160 may utilize tunnels between the PGW and the base stations. For example a first path 170 is annotated showing the flow of data packets from PGW 121 to HeNodeB 132. In order to implement this path a tunnel may be set up between the PGW 121 and SGW 122, and another tunnel may be set up between SGW 122 and HeNodeB 132. The tunnels encapsulate the data packets received from the UE 160 and the packet data network 125 for transmission between the UE 160 and the packet data network 125. As described above, such tunnels may enable mobility, billing, legal intercept, etc. Also, as described above, the set up and termination of these tunnels can add a significant amount of overhead to the cellular network 100 operation when only short, frequent data sessions are the norm in the network.

Below embodiments are described that provide native IP forwarding for at least a portion of the traffic and the use of tunneling when needed to deal with UE 160 mobility. The architecture of the embodiments envisions a clear-cut separation between the CN and the RAN 230.

The RAN 230 may support all features related to the particular access technology. For LTE, the RAN 230 may support L2/3 mobility management tasks such as path switching, active/idle-state management and paging.

Figure 2:
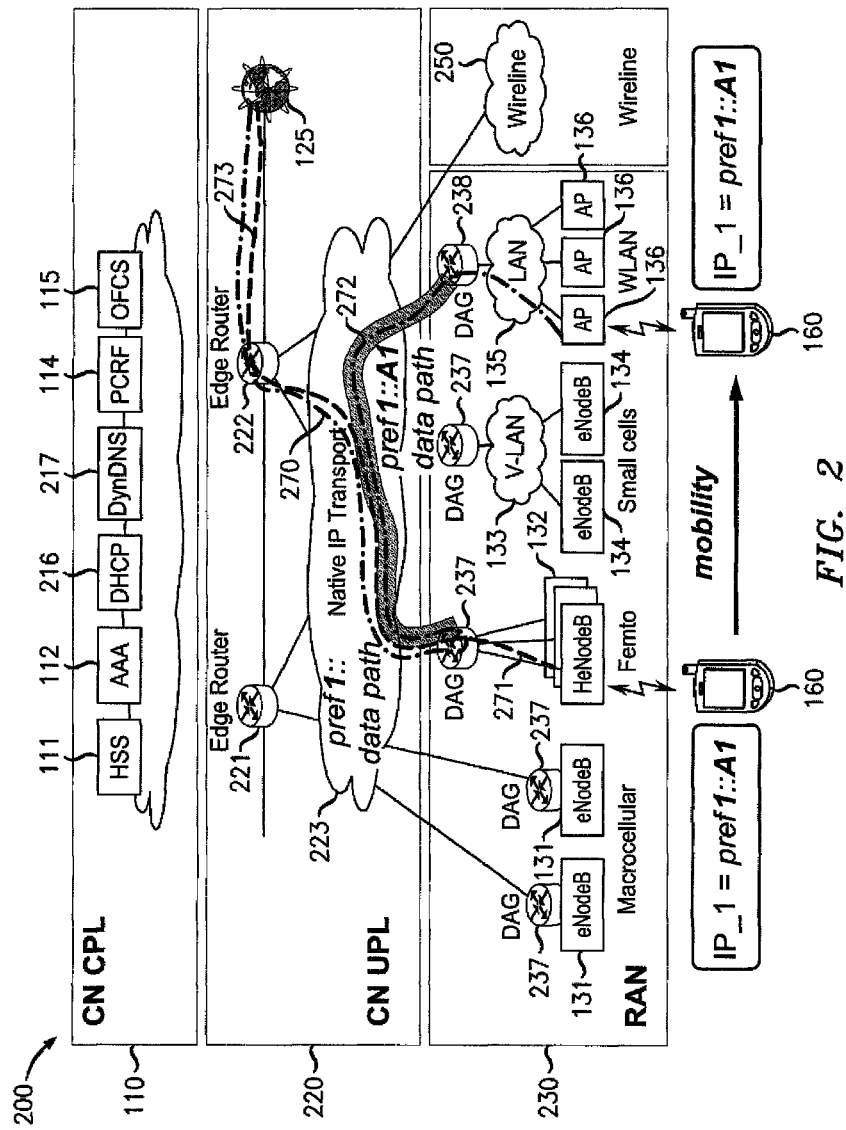
FIG. 2 describes a cellular network 200 according to a first embodiment.

FIG. 2 describes a cellular network 200 according to a first embodiment. The cellular network 200 may include a CN CPL 210, CN UPL 220, a RAN 230, and a wireline 250. Note that the wireline access 250 may now be included, as opposed to today's LTE because all access technologies are treated the same. Certain elements in the cellular network 200 are identical to those in the Cellular network 100 and will have the same reference number.

The CN CPL 210 may implement generic control plane functions such as HSS 111, AAA 112, PCRF 114, DHCP 216, DynDNS 217 OFSS 115, etc. while in the CN UPL 220, transport may be based on native IP routing. The CN UPL 220 may include edge routers 221, 222 and native IP transport network 223, which may be implemented using well know and readily available networking equipment. The CN UPL 220 may therefore be the same for a wireless and a wireline network and may scale to any network size.

Advantageously, the separation between the RAN 230 and the core network may allow access technologies to evolve independently from core network functionality. As a result, the CN may further utilize commoditized off-the-shelf components, which lowers capital expenditures (CAPEX) and operating expenditures (OPEX), because no specialized, e.g., cellular-specific, functions are used.

This architecture may replace per-user tunnel management through native IP forwarding for the vast majority of traffic. This may improve scalability, reduce processing overhead, and permit migrating to general-purpose processors for user-plane traffic processing. It further may permit using a single core network for wireless and wire line access. Also concepts of software-defined networking (SDN) may be applied to the core network to further reduce OPEX.

The RAN 230 may include eNodeBs 131, 134, HeNodeBs 132, APs 136, V-LAN 133, LAN 135, and the distributed access gateways (DAG) 237, 238, 239, which represent the edge router of the access network. The eNodeBs 131, 134, HeNodeBs 132, APs 136, V-LAN 133, and LAN 135 are the same as previously described with respect to FIG. 1 above.

Each DAG 237, 238, 239 may sustain its own unique set of globally routable network prefixes. From the L3 perspective, UEs 160 are directly connected to the DAG 237 and hold IP addresses that pertain to their respective DAG's subnet(s). This may enable native IP forwarding of userplane traffic. The UE's attachment/detachment procedures with the network may be handled by the DAG 237, which may interact with AAA 112 and HSS 111 for this purpose. Security keys established after attachment are held by the DAG 237.

The DAG 237 may be co-located with the eNodeB 131, which may be appropriate in macro-cellular deployments, or it may reside on an aggregation router to support small-cell deployments. In the latter case, traffic forwarding below the DAG 237 may rely on L2 Ethernet bridging, and the eNodeB 134 may become a L2 relay. For such deployments, IPv6 has the advantage over IPv4 in that secure neighbor discovery (SeND, RFC 3971) may be used to secure Ethernet signaling. Femtocells, such as HeNodeBs 132, may use an IPsec tunnel to connect with the DAG 237.

The CN CPL 210 may support AAA and HSS, which may be used for network attachment or detachment. The CN CPL 210 may further support a DHCP 216 service to furnish DAGs 237 with IP prefixes. It may also support a PCRF 114, which responds to DAGs' policy and charge rule requests, and an OFSS 115 function which also interfaces with DAGs 237 to collect per-user charging records. Finally, the CN CPL 210 may support DNS 216 services for external name-address resolution and a DynDNS 217 service for name-address resolution of UEs 160.

Enterprise access point names (APNs) may require a centralized APN gateway, which enforces APN aggregate maximum bitrate (APN-AMBR) and may support connectivity to the enterprise. Because the IP address pool may be controlled by the enterprise, the IP address pool may not be used for native IP routing in aggregation and core network. Instead, the UE's IP address for each enterprise network may have to remain fixed and data may have to be tunneled from APN gateway to the DAG 237. For this purpose, the present GPRS tunneling protocol (GTP) tunneling mechanism of LTE may be used. While GTP tunneling mechanisms re-introduces inefficiencies, the GTP tunneling may only be invoked for a small fraction of traffic, where scalability is of lesser concern. In the following discussion, the focus is on generic consumer traffic for which no special APN support is required.

Active-state mobility management will now be described. When an active UE 160 moves to a new eNodeB 131 underneath the same DAG 237, Ethernet bridging may ensure mobility support. When the new eNodeB 131 is associated with a different DAG 237, the old DAG 237 may become an anchor for all ongoing sessions. Ongoing sessions may be illustrated by the paths 270, 271, 272, and 273 denoted in FIG. 2. Path 270 connects the packet data network 125 through the edge router 222 to the DAG 237. The path 271 connects the DAG 237 to the HeNodeB 132. The path 272 connects a first DAG 237 to a second DAG 238. Finally, the path 273 is a path in the opposite direction from the path 270. During initial operation, data travels between the packet data network 125 and the HeNodeB 132 via paths 270 and 271 through the native IP transport network 223 and the DAG 237.

When the UE 160 moves from the HeNodeB 132 to the AP 136, the incoming data may be tunneled by the first DAG 237 to the second DAG 238 and outgoing data may move in the reverse direction. The nature of this tunnel is not critical (e.g., GTP may be used, for instance). Further, the existing X2 interface may be leveraged for this purpose. The X2 interface is part of the LTE standard that allows for tunneling between neighboring eNodeBs.

When a UE 160 with existing connections moves to a second DAG 238, the first DAG 237 may have to signal all UE-specific state information (QoS, PCEF, session key) to the second DAG 238. Again, existing X2 signaling may be leveraged for this purpose. The first DAG 237 may release UE-specific state information as soon as the last connection it tunnels for this UE 160 has been discontinued.

If the UE 160 were to move yet again to another third DAG 239, the third DAG 239 would communicate with the first DAG 237 to establish a new tunnel for data to and from the UE 160. Further, the first DAG 237 would terminate the tunnel with the second DAG 238. This new tunnel would then provide the communication between the UE 160 and the data packet network 125 via the third DAG 239, the new tunnel, and the first DAG 237. Any tunneling back to the first DAG 237 would continue until the session between the UE 160 and the data packet network 125 terminates.

Figure 3:
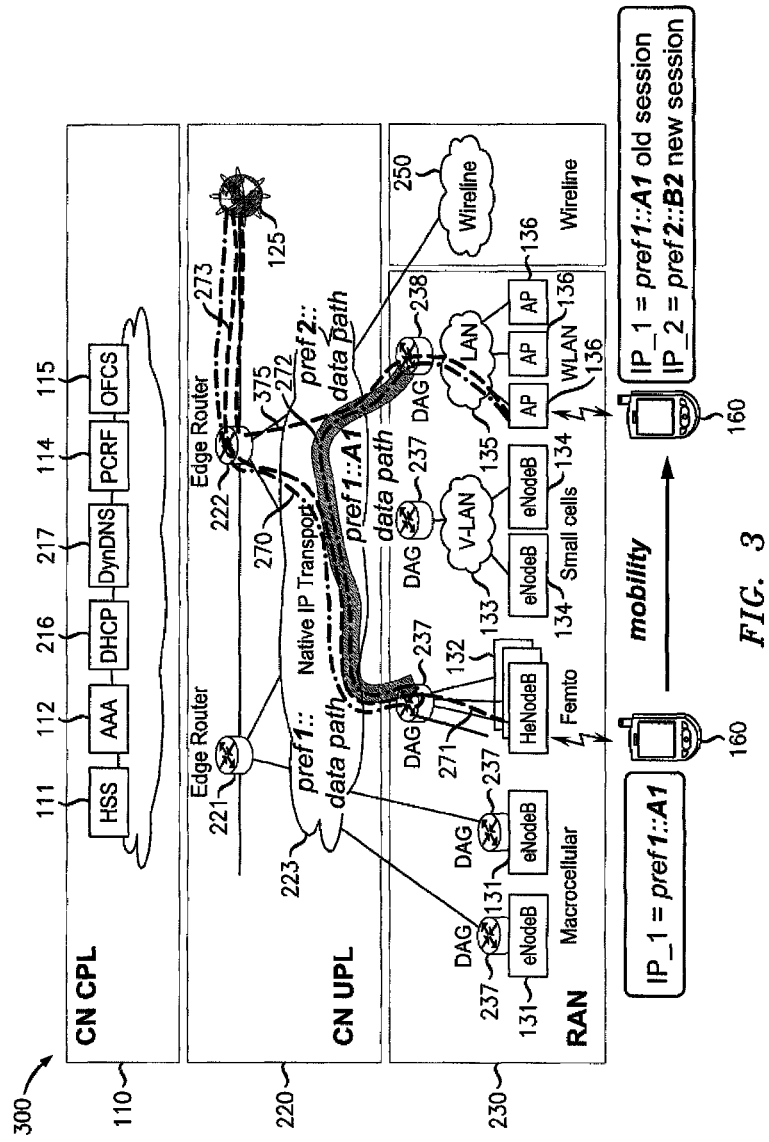
FIG. 3 describes a cellular network 300 according to a second embodiment.

FIG. 3 describes a cellular network 300 according to a second embodiment. The hardware and layout of the cellular network 200 may be the same as that for the cellular network 200 in FIG. 2. The difference occurs in the operation of the DAG 239 and the UE 160. In FIG. 3, if the UE moves to the second DAG 238, the data for a first session with a first IP address IP__1 will still be used for that session. In FIG. 3, when a new session is initiated by the UE 160, a new IP address IP__2 may be assigned to the data traffic for the new session. The data for the new session then travels along a path 375 between the UE 160 and the data packet network 125. The path 375 is a native IP data path from the DAG 238 to the native IP transport network 223, through the edge router 222, and to the data packet network 125 without the use of any tunneling. As a result a reduction in the amount of data tunneled through the first DAG 237 may be accomplished by the use of the new local IP address IP__2 even though any ongoing connections still use the old IP address IP__1 from the first DAG 237 where they originated. In this situation, the UE 160 must be able to simultaneously support multiple IP addresses. All packets belonging to the new session associated with IP__2 take the optimal path through the native IP routing infrastructure and do not create additional burden on the first DAG 237 or on the tunnel between the first DAG 237 and the second DAG 238.

Further, if UE 160 were to move to a third DAG 239, a tunnel between the third DAG 239 may be initiated with the second DAG 238 in order to route data for the second session according to the second IP address IP__2 through the second DAG 238. Further, the third DAG 239 may initiate another tunnel with the first DAG 237 in order to route data for the first session with the first IP address IP__1 through the first DAG 237. The first DAG 237 may then terminate the tunnel with the second DAG 238.

Idle-state mobility management will now be described. Evolved packet core connection management (ECM) connection-state management is handled by the RAN 230 because it represents a mobility-related and air-interface-dependent task. In first and second embodiments described above this function may be assigned to the DAGs 237.

In the idle state, the last DAG 237 contacted by the UE 160 keeps the UE's state information (session key, ECM connection state, etc.) When the UE 160 conducts a tracking-area update at a new DAG, the UE's state information may be transferred from the old to the new DAG. During this transfer, the UE 160 may also obtain a new local IP address.

For an inter-DAG state transfer, the new DAG may have to contact the UE's old DAG. To keep air-interface signaling compliant with present LTE specifications, the MME identifier contained in the UE's tracking area update (TAU) request may be used as a pointer to the old DAG for this purpose. This implies that each DAG obtains its own MME ID. Alternatively, the DAG may send an IP discovery message to the UE 160 (e.g., an internet control message protocol (ICMP) Echo Request message), which reveals the UE's old IP address and thereby reveals the old DAG's prefix. Each DAG further may define a tracking area, which it may forward to the UE during the TAU.

The concept of IP locality may lead to the need for new solutions to user reachability. In some embodiments, the embodiments described above may include one of two solutions, which adapt to the behavior of existing applications. The first solution may satisfy applications that rely on DNS to resolve user locations. The second solution targets applications that may sustain their own user-to-address mapping and may provide intrinsic mobility support such as integrated message service (IMS).

For a first group of applications related to the first solution, the cellular network may leverage DynDNS to resolve the user's current IP address and may embed paging into the DNS handshake. For the purpose of embedding paging into the DNS handset, the CN CPL 210 may support a DynDNS service which holds the mapping between the user's name (e.g., IMSI, TMSI or NAI) and the DAG where the user was seen last. This mapping may be updated when the UE moves to a new DAG, either to send/receive data or to perform a TAU. The DAG may hold a local DynDNS instance, which may contain the mapping between the user's name and the UE's IP address.

When a DNS request arrives for a user, the central DynDNS may forward the request to the user's last known DAG. In case the where the UE 160 is in an active state, the UE 160 homes at this DAG, and the DAG may return a DNS reply with the UE's local IP address. When the UE 160 is idle, the DAG may initiate a paging function. When the UE 160 responds to the page on a new DAG, the UE 160 may receive a new IP address, which the new DAG encloses into the DNS reply message. In this manner, reachability remains a DNS-related task for the core network.

Applications, which sustain their own user-to-address mapping and mobility support (e.g., IMS), may not conduct DNS handshakes prior to callbacks or notifications. Instead, the UE 160 may update the application's location service (e.g., session initiation protocol (SIP) registrar) when it obtains a new IP address. While the UE 160 is in active state, this address may be routable and incoming notifications may be received. When the UE is in idle state, incoming packets may reach the UE's last DAG of contact, which buffers the packet and initiates a paging function. When the UE 160 responds to a page on a new DAG, the connection may be started via a tunnel between the old and new DAGs. Subsequently, the application uses its embedded mobility feature to migrate the session to the UE's local IP address at the new DAG (e.g. SIP mobility). To ensure optimal routing, this solution may only be supported for protocols that inherently embed mobility.

All other applications, which sustain their own location service but no intrinsic session mobility support (e.g., Skype) may be upgraded to either support DynDNS or mobility.

The WLAN may include of multiple Wi-Fi APs 136 attached to an 802.3 distribution network underneath a DAG 238. This arrangement is essentially the same as for an LTE small cell cluster, and authentication/security, addressing, policy enforcement, charging, and userplane transport may follow along the same lines as for the LTE small cell cluster.

Because Wi-Fi does not support idle/active state differentiation and paging, the UE 160 may be considered active as long as it has L2 connectivity at the WLAN. Reachability is therefore supported via DynDNS in the same manner as for LTE.

When the UE 160 moves from LTE to WLAN or vice versa, the same local inter-DAG tunneling mechanism may be used for ongoing connections.

Native IP routing may allow for local data breakout, because the data does not travel to the core of the network encapsulated in a tunnel. Further, native IP routing may also enable placing content caches closer to the end user. Content Distribution Networks (CDNs) are already deployed in some wireline networks today. The cellular network embodiments described above may allow the deploying of such CDNs basically unchanged in cellular networks as well. For the most popular content it might even make sense to co-locate cache servers with the DAGs.

Figure 4:
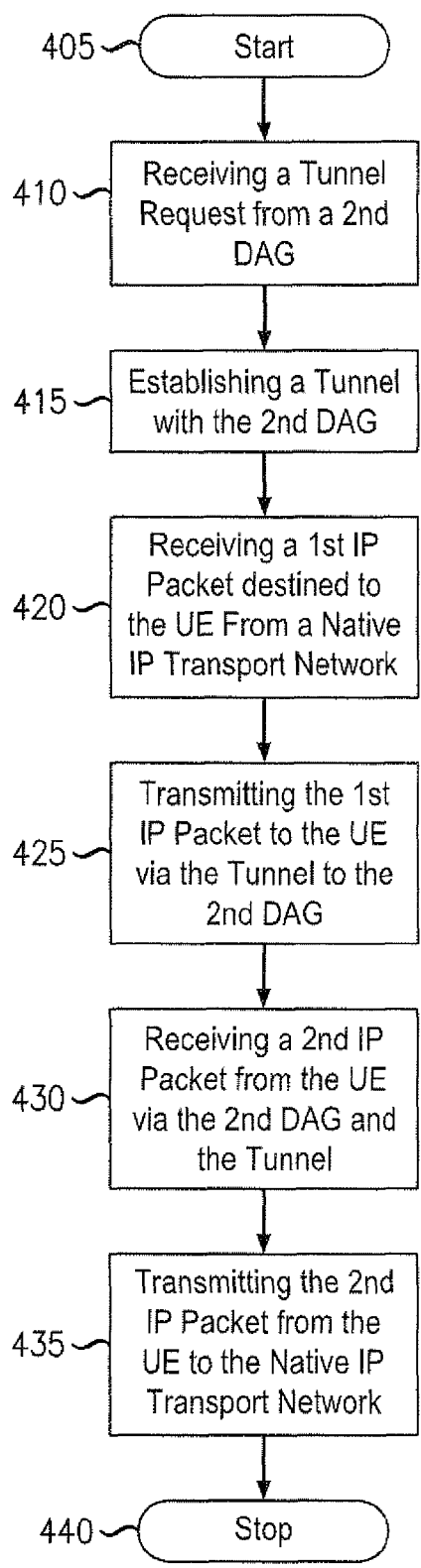
FIG. 4 illustrates a method of operation of a DAG as found in FIG. 2.

FIG. 4 illustrates a method of operation of a DAG as found in FIG. 2. The method may begin at step 405. A first DAG 237 may receive 410 a tunnel request from a second DAG 238. Next, the first DAG 237 may establish 415 a tunnel with the second DAG 238. The first DAG 237 then may receive 420 a first IP packet destined to the UE 160 from a native IP transport network 223. Next, the first DAG 237 may transmit 425 the first IP packet to the UE 160 via the tunnel to the second DAG 238. Transmitting the first IP packet to the UE 160 may also include determining the specific DAG 238 associated with the UE 160. One way the first DAG 237 may determine the specific DAG 238 associated with the UE 160 may be to compare the prefix of the destination IP address for the first IP packet with known prefixes associated with known DAGs. The first DAG 237 then may receive 430 a second IP packet from the UE 160 via the second DAG 238 and the tunnel. Finally, the first DAG 237 may transmit 435 the second IP packet from the UE 160 to the native IP transport network 223.

Figure 5:
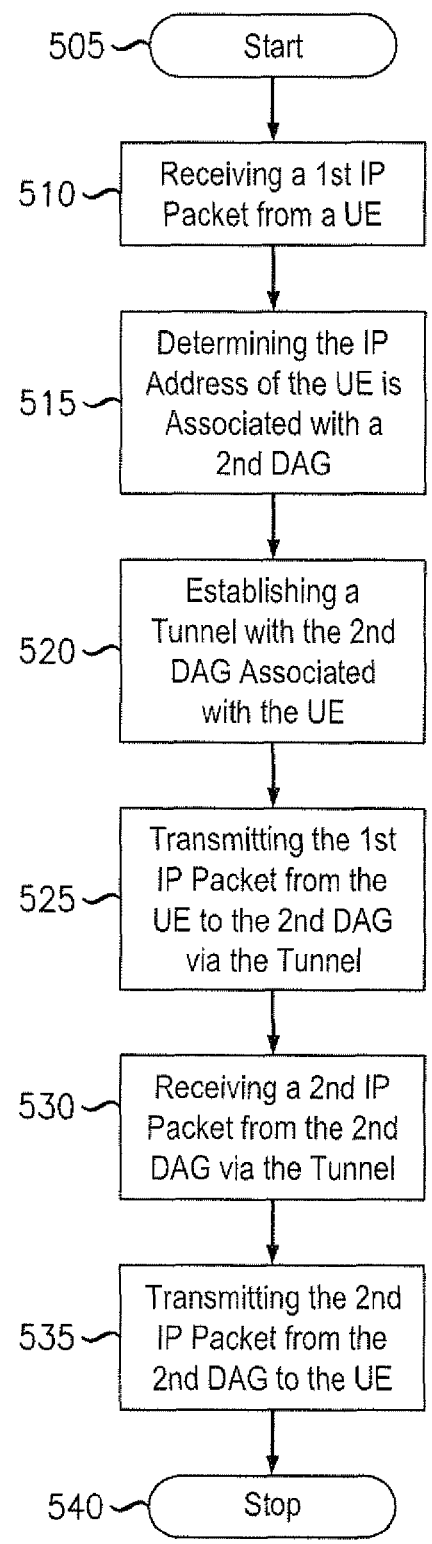
FIG. 5 illustrates another method of operation of a DAG as found in FIG. 2.

FIG. 5 illustrates another method of operation of a DAG as found in FIG. 2. The method may begin at step 505. A first DAG 238 may receive 510 a first IP packet from a UE 160. Next, the first DAG 238 may determine 515 that the IP address of the UE 160 is associated with a second DAG 237. This may be done by identifying the prefix of the IP address used by the UE 160 to transmit data as being associated with a second DAG 237. Next, the first DAG 238 may establish 520 a tunnel with the second DAG 237 associated with the UE 160. The first DAG 238 may then transmit 525 the first IP packet from the UE 160 to the second DAG 237 via the tunnel. Next, the first DAG 238 may receive 530 a second IP packet from the second DAG 237 via the tunnel. The first DAG 237 may then transmit 535 the send IP packet from the second DAG to the UE 160. Finally, the method may end at 540.

Figure 6:
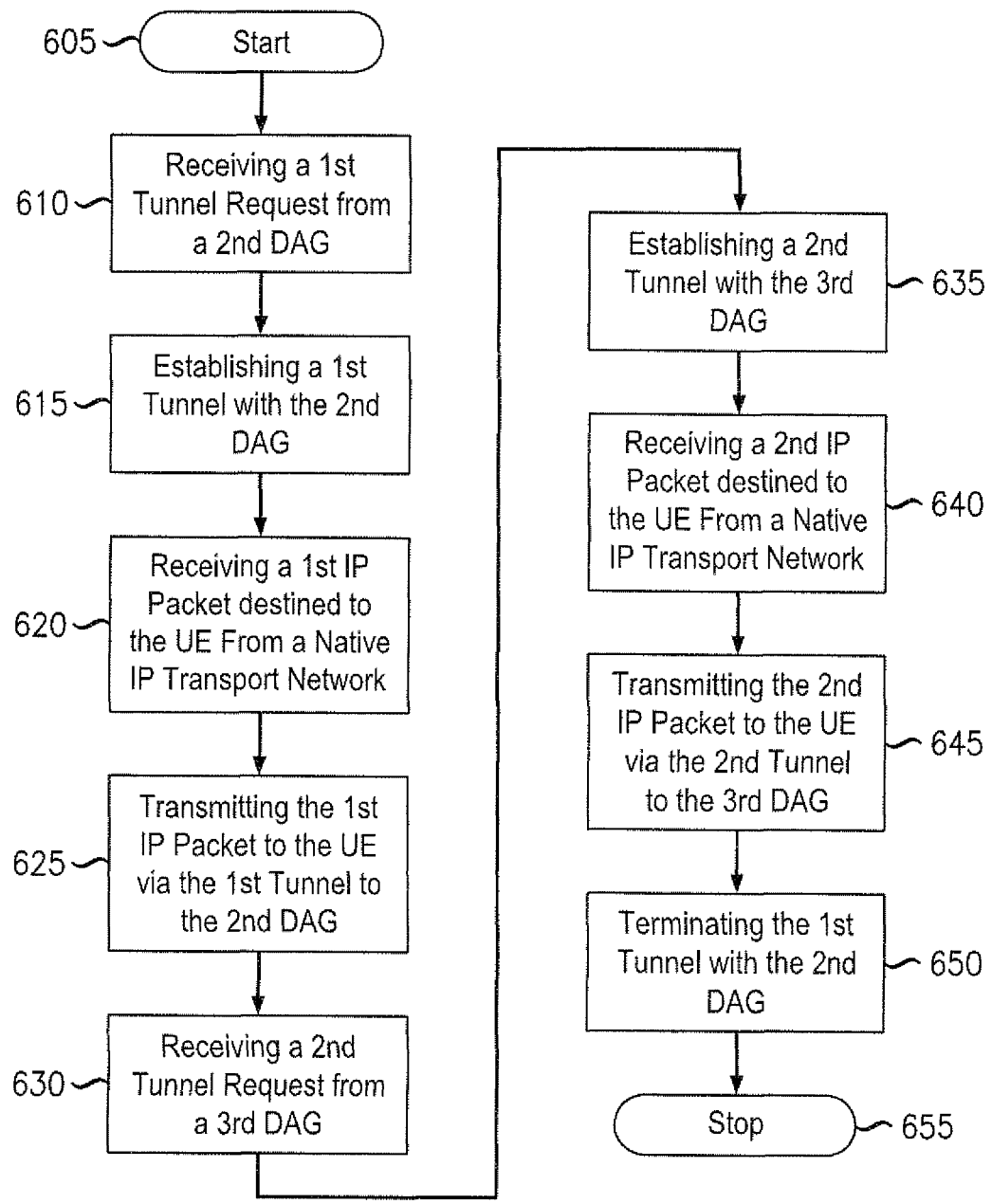
FIG. 6 illustrates another method of operation of a DAG as found in FIG. 2.

FIG. 6 illustrates another method of operation of a DAG as found in FIG. 2. 2. The method may begin at 605. The first DAG 237 may receive 610 a first tunnel request from a second DAG 238. Next, the first DAG 237 may establish 615 a first tunnel with the second DAG 238. The first DAG 237 then may receive 620 a first IP packet destined to the UE 160 from a native IP network 223. Next, the first DAG 237 may transmit 625 the first IP packet to the UE 160 via the first tunnel to the second DAG 238. The first DAG 237 then may receive 630 a second tunnel request from a third DAG 239. Next, the first DAG 237 may establish 635 a second tunnel with the third DAG 239. The first DAG 237 then may receive 640 a second IP packet destined to the UE 160 from a native IP transport network 223. The first DAG 237 then may transmit 645 the second IP packet to the UE 160 via the second tunnel to the third DAG 239. Next, the first DAG 237 may terminate 650 the first tunnel with the second DAG 238. Finally, the method may end at 655.

Figure 7:
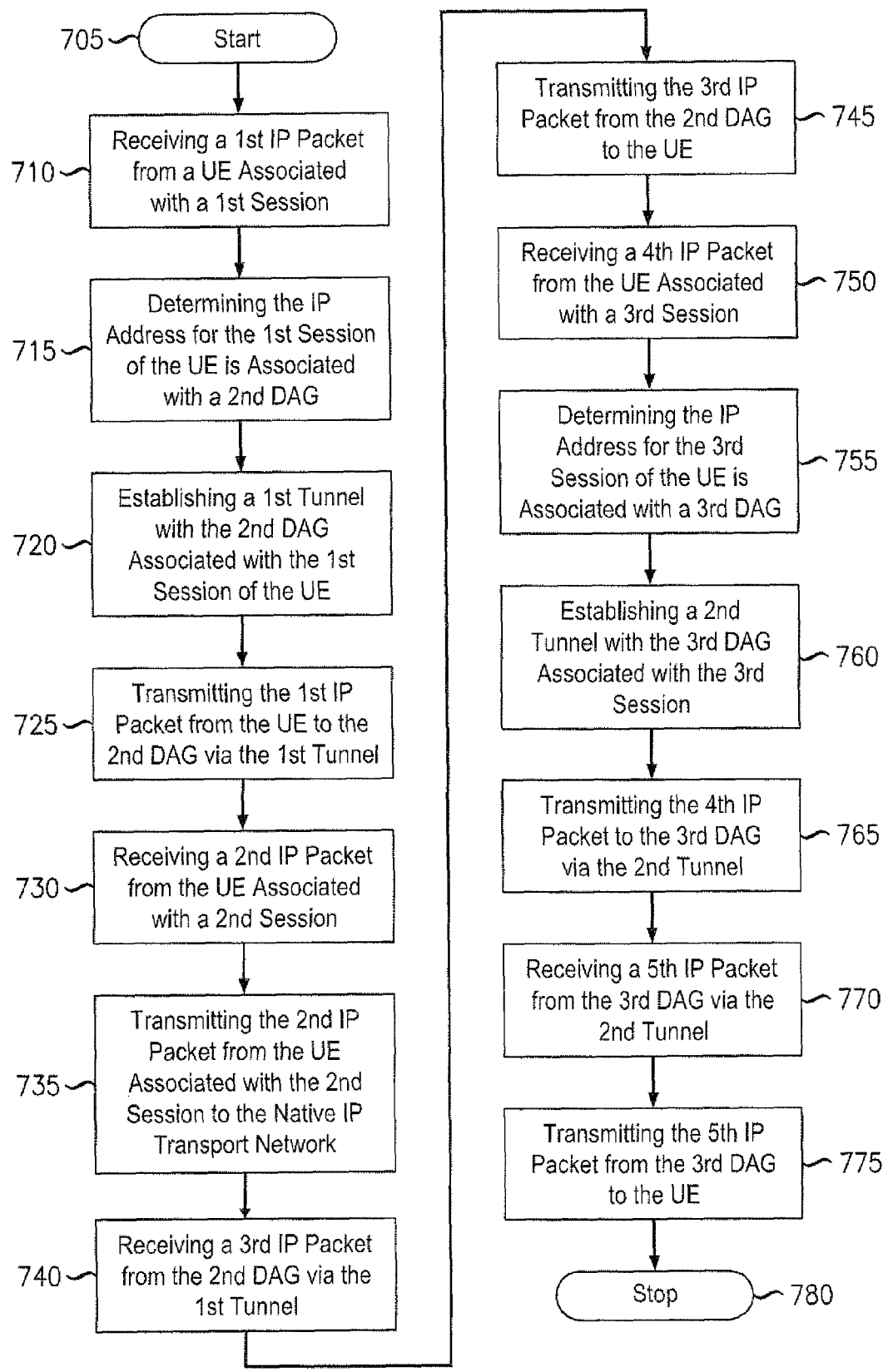
FIG. 7 illustrates another method of operation of a DAG as found in FIG. 2.

FIG. 7 illustrates another method of operation of a DAG as found in FIG. 2. 3. The method may start at 705. The first DAG 238 may receive 710 a first IP packet from a UE 160 associated with a first session. Next, the first DAG 238 may determine 715 that the IP address for the first session of the UE 160 is associated with a second DAG 237. This may be done be identifying the prefix of the IP address used by the UE to transmit data as being associated with a second DAG 237. The first DAG 238 then may establish 720 a first tunnel with the second DAG 237 associated with the first session of the UE 160. Next, the first DAG 238 may transmit 725 the first IP packet from the UE 160 to the second DAG 237 via the first tunnel. The first DAG 238 may receive 730 a second IP packet from the UE 160 associated with a second session. Next, the first DAG 238 may transmit 735 the second IP packet from the UE associated with the second session to the native IP transport network 223. The first DAG 238 also may receive 740 a third IP packet from the second DAG 237 via the first tunnel. Next, the first DAG 238 may transmit 745 the third IP packet from the second DAG 237 to the UE 160. The first DAG 238 may receive 750 the fourth IP packet from the UE 160 associated with a third session. Next, the first DAG 238 may determine 755 that IP address for the third session of the UE 160 associated with a third DAG 239. The first DAG 238 then may establish 760 a second tunnel with the third DAG associated with the third session. Next, the first DAG 238 may transmit 765 the fourth IP packet to the third DAG 239 via the second tunnel. The first DAG 238 then may receive 770 a fifth IP packet from the third DAG via the second tunnel. Next, the first DAG 238 may transmit 775 the fifth IP packet from the third DAG to the UE 160. Finally, the method may end at 780.

Figure 8:
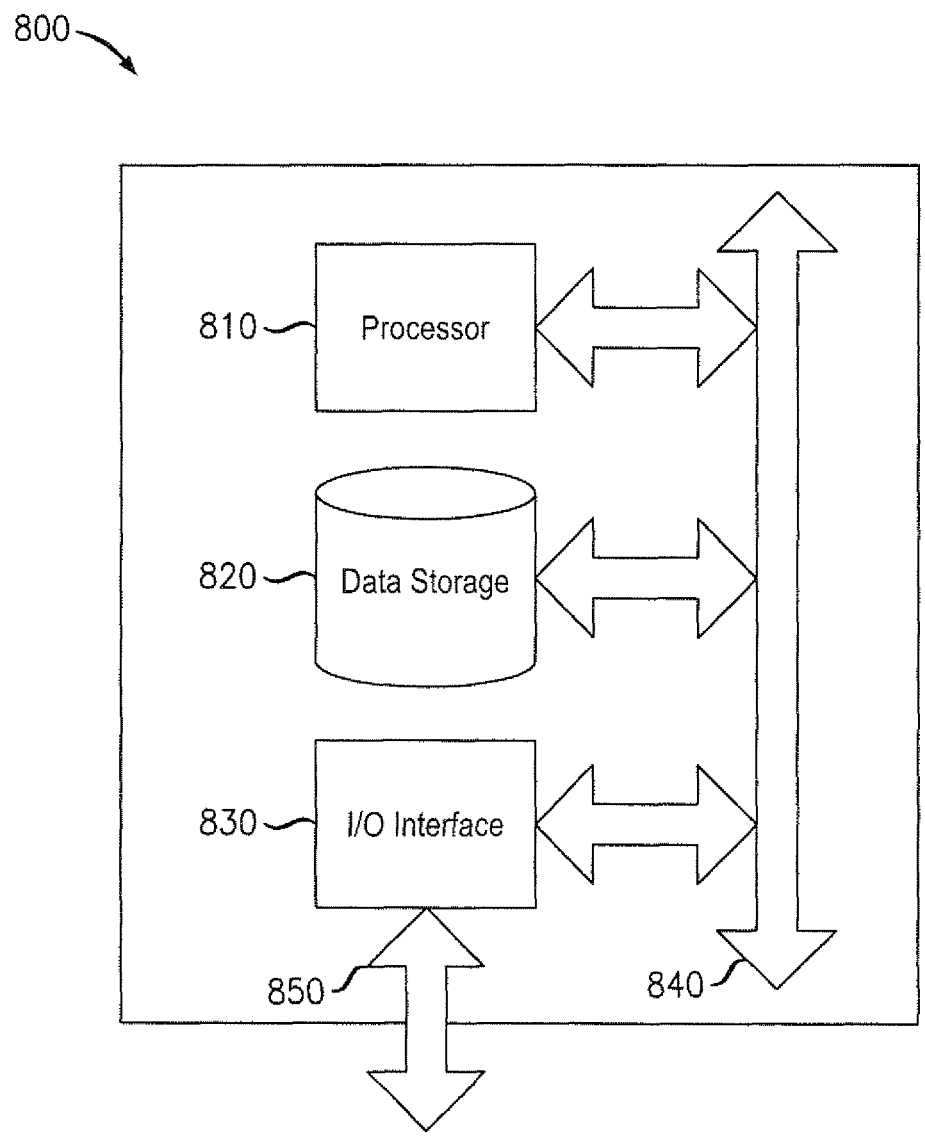
FIG. 8 illustrates a block diagram of a distributed access gateway.

FIG. 8 illustrates a block diagram of a distributed access gateway. The DAG 800 may include a processor 810, a data storage unit 820, an I/O interface 830, a system bus 840, and a network link 850.

The processor 810 may control the operation of the DAG 800 and cooperate with the data storage 820 and the I/O interface 830, via a system bus 840. As used herein, the term "processor" will be understood to encompass a variety of devices such as microprocessors, field-programmable gate arrays (FPGAs), application-specific integrated circuits (ASICs), and other similar processing devices.

The data storage 820 may store program data such as various programs useful in managing resources in a cloud. For example, the data storage 820 may include instructions for performing one or more methods such as, for example, those described above. The data storage 820 may also store data related to the operation of the DAG and for interacting with other DAGs.

The I/O interface 830 may cooperate with the processor 810 to support communications over one or more communication channels. For example, the I/O interface 830 may include a user interface, such as a keyboard and monitor, and/or a network interface, such as one or more Ethernet ports. The I/O interface 830 may also connect to the network link 850. The network link 850 may transmit and receive data packets and other control information as needed. The network link 850 may also include a number of different network links for communicating various types of data.

In some embodiments, the processor 810 may include resources such as processors/CPU cores, the I/O interface 830 may include any suitable network interfaces, or the data storage 820 may include memory or storage devices. Moreover the DAG 800 may be any suitable physical hardware configuration such as: one or more server(s), blades consisting of components such as processor, memory, network interfaces or storage devices. In some of these embodiments, the DAG 800 may include cloud network resources that are remote from each other.

In the description above of various embodiments, it is noted that various method steps are described. Such steps are described in a certain order. It is not intended that such an order is the only order possible. Therefore, other embodiments where the steps are performed in different orders are considered to be within the scope of the claims. Further, the use of the descriptors first, second, third, etc. are not intended to require that certain steps be carried out in a specific order, rather these terms are used to differentiate multiple instances of various distinct and separate elements of the same type that my appear repeatedly in the embodiments.

In the descriptions above a native IP transport network is described that transmits IP packets. This is only an example of a native packet transport network that may be used in the described embodiments. Other types of native packet transport networks may be used instead of IP transport networks. Such networks would transmit data packets and use network addresses instead of IP packets and IP addresses as described above.

In some embodiments, the distributed access gateway may be a general purpose computer programmed to perform the methods described above. The distributed access gateway may also be a router, switch or other network gear that includes a processor, memory, and network interfaces.

When processor-executable programs are implemented on a processor, the program code segments may combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

It should be apparent from the foregoing description that various exemplary embodiments of the invention may be implemented in hardware or firmware, such as for example, the distributed access gateway. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for transmitting data packets in a cellular network to user equipment using a first distributed access gateway, comprising:
    receiving a first tunnel request from a second distributed access gateway;
    establishing a first tunnel with the second distributed access gateway;
    receiving a first data packet destined to the user equipment from a native packet transport network; and
    transmitting the first data packet to the user equipment via the first tunnel to the second distributed access gateway, wherein the first distributed access gateway and the second distributed access gateway each sustain its own unique set of globally routable network prefixes and the user equipment has an Internet Protocol (IP) address associated with the first distributed access gateway, and the user equipment is directly connected to the second distributed access gateway at the network layer (L3).

2. The method of claim 1, further comprising:
    receiving a second data packet from the user equipment via the second distributed access gateway and the first tunnel; and
    transmitting the second data packet to the native packet transport network.

3. The method of claim 1, further comprising:
    receiving a second tunnel request from a third distributed access gateway; and
    establishing a second tunnel with the third distributed access gateway.

4. The method of claim 3, further comprising:
    receiving a second data packet destined to the user equipment via the native packet transport network; and
    transmitting the second data packet to the user equipment via the second tunnel.

5. The method of claim 4, further comprising:
    terminating the first tunnel.

6. The method of claim 1, wherein transmitting the first data packet to the user equipment via the first tunnel to the second distributed access gateway further includes:
    determining the second distributed access gateway associated with the user equipment.

7. The method of claim 6, wherein determining the second distributed access gateway associated with the user equipment further includes:
    comparing a prefix of a destination network address for the first data packet with known prefixes associated with a plurality of other distributed access gateways.

8. A non-transitory program storage device readable by a machine, embodying a program of instructions executable by the machine to perform the method of claim 1.

9. A method for transmitting data packets in a cellular network to user equipment using a first distributed access gateway, comprising:
    receiving a first data packet from the user equipment;
    determining the network address of the user equipment associated with a second distributed access gateway;
    establishing a first tunnel with the second distributed access gateway associated with the user equipment;
    transmitting the first data packet from the user equipment to the second distributed access gateway via the first tunnel, wherein the first distributed access gateway and the second distributed access gateway each sustain its own unique set of globally routable network prefixes and the user equipment has an Internet Protocol (IP) address associated with the first distributed access gateway, and the user equipment is directly connected to the second distributed access gateway at the network layer (L3).

10. The method of claim 9, further comprising:
    receiving a second data packet from the second distributed access gateway via the tunnel; and
    transmitting the second data packet to the user equipment.

11. The method of claim 9, wherein:
    the first data packet is associated with a first session;
    the network address is associated with the first session; and
    the first tunnel is associated with the first session.

12. The method of claim 11, further comprising:
    receiving a second data packet from the user equipment associated with a second session; and
    transmitting the second data packet to a native packet network.

13. The method of claim 12, further comprising:
    receiving a third data packet from the second distributed access gateway via the first tunnel; and
    transmitting the third data packet from the second distributed access gateway to the user equipment.

14. The method of claim 13, further comprising:
    receiving a fourth data packet from the user equipment associated with a third session;
    determining that a data address for the third session of the user equipment is associated with a third distributed access gateway;
    establishing a second tunnel with the third distributed access gateway with the third session; and
    transmitting the fourth data packet from the third distributed access gateway via the second tunnel.

15. The method of claim 14, further comprising:
receiving a fifth data packet from the third distributed access gateway via the second tunnel; and
transmitting the fifth data packet from the third distributed access gateway to the user equipment.

16. The method of claim 9, wherein determining the network address of the user equipment associated with the second distributed access gateway includes:
matching a prefix of the network address of the user equipment with network address prefixes associated with the second distributed access gateway.

17. A non-transitory program storage device readable by a machine, embodying a program of instructions executable by the machine to perform the method of claim 9.

18. A distributed access gateway, comprising:
a data storage unit;
a network interface; and
a processor configured to:
receive a first tunnel request from a second distributed access gateway;
establish a first tunnel with the second distributed access gateway;
receive a first data packet destined to user equipment from a native packet transport network; and
transmit the first data packet to the user equipment via the first tunnel to the second distributed access gateway, wherein the first distributed access gateway and the second distributed access gateway each sustain its own unique set of globally routable network prefixes and the user equipment has an Internet Protocol (IP) address associated with the first distributed access gateway, and the user equipment is directly connected to the second distributed access gateway at the network layer (L3).

19. The distributed access gateway of claim 18, wherein the processor is further configured to:
receive a second data packet from the user equipment via the second distributed access gateway and the first tunnel; and
transmit the second data packet to the native packet transport network.

20. The distributed access gateway of claim 18, wherein the processor is further configured to:
receive a second tunnel request from a third distributed access gateway; and establish a second tunnel with the third distributed access gateway.

* * * * *